No. 687,721. Patented Dec. 3, 1901.
T. W. BRYANT.
WHEEL FOR ROLLER SKATES.
(Application filed Nov. 21, 1900.)
(No Model.)
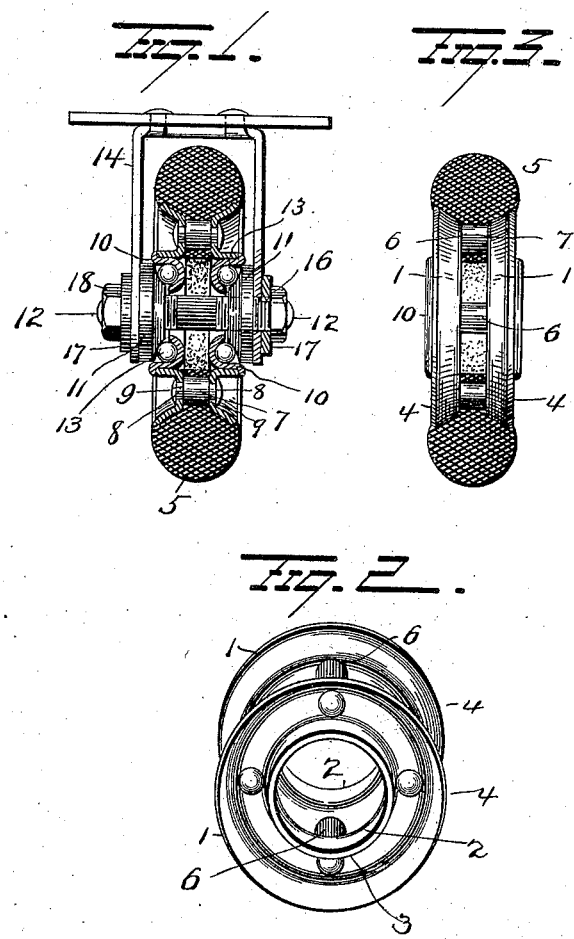
WITNESSES
INVENTOR
Attorney

UNITED STATES PATENT OFFICE.

THOMAS WALLACE BRYANT, OF TORRINGTON, CONNECTICUT.

WHEEL FOR ROLLER-SKATES.

SPECIFICATION forming part of Letters Patent No. 687,721, dated December 3, 1901.

Application filed November 21, 1900. Serial No. 37,270. (No model.)

*To all whom it may concern:*

Be it known that I, THOMAS WALLACE BRYANT, of Torrington, in the county of Litchfield and State of Connecticut, have invented certain new and useful Improvements in Wheels for Roller-Skates; and I do hereby declare the following to be a full, clear, and exact description of the invention, such as will enable others skilled in the art to which it appertains to make and use the same.

My invention relates to an improvement in wheels for roller-skates, and more particularly to such as are provided with rubber tires, one object of the invention being to so construct and assemble the parts of a rubber-rimmed skate-wheel that lateral displacement of the devices which secure the rim or tire in place will be effectually prevented.

A further object is to construct a wheel of the class specified in such manner as to render impossible the shaking loose of any of the parts of the wheel or of its bearing.

A further object is to so construct a skate-wheel as to insure the greatest possible resilience of the tire.

With these objects in view the invention consists of a wheel comprising two disks rigidly secured together and provided with an intervening space and a rubber rim or tire molded between the disks and projecting radially therefrom.

The invention further consists in a wheel comprising two disks having peripheral flanges coöperating to form a rim or tire seat, said disks permanently spaced apart and held rigidly against movement toward or away from each other by rivets, and a rubber rim or tire encircling said seat and disposed on and between the flanges forming the same.

My invention further consists in certain novel features of construction and combinations of parts, as hereinafter set forth, and pointed out in the claims.

In the accompanying drawings, Figure 1 is a view showing my improved wheel in section and also the mounting of the same. Fig. 2 is a detail view of the frame of the wheel. Fig. 3 is an edge view with the rim or tire in section.

In constructing my improved wheel I employ a frame or cage comprising two sheet-metal disks 1 1, each having a central opening 2, and the metal of said disks is pressed outwardly to form an annular flange 3 around the periphery of each opening. Each disk is also pressed outwardly at its periphery to form annular flanges 4, and when the disks are assembled in the manner presently explained the annular peripheral flanges 4 coöperate to form a seat for a rubber rim or tire 5. The disks 1 1 are spaced a suitable distance apart and rigidly secured by means of several rivets 6, each of which is constructed with a body portion 7 and a shank or stem 8 at each end. The body portion 7 of each rivet is disposed between the disks and the shoulders 9 at the juncture of said body portion, and the shanks bear against the inner faces of the disks, so as to prevent any possibility of displacement of the latter in a direction toward each other, while the shanks 8 are passed through the disks and then upset, so as to prevent lateral displacement of said disks in the opposite direction. The frame or cage of the wheel as thus assembled and secured is a rigid structure, every part of which is fixed and incapable of displacement, such as is liable to occur from vibration or other cause with structures in which the various parts are made detachable.

Around the frame or cage constructed as above described the rubber rim or tire 5 is molded, with portions of the rubber adapted to enter between the disks and surrounding the rivets 6 to a greater or less extent. In practice not more than three or four rivets 6 will be necessary, and the portions of the rubber rim between the rivets will have no impediment to the resilience thereof, the rubber of the rim entering the spaces between the rivets and, having no internal support or bearing at these points, will be free to yield to their full capacity. Furthermore, portions of the rubber rim entering between the rivets will act as keys or stops to prevent any possibility of the rim creeping on the frame.

The inner annular flanges 3 serve as holders for ball-cups 10, and these coöperate with adjustable cones 11 on the axle 12 to constitute bearings for balls 13. The axle 12 is passed through holes in the truck-arms 14, which depend from the foot-plate 15 of the skate, and provided at points beyond its bearings in said arms with flat faces 16. A washer 17, having holes similar in shape to the cross-section of the flattened portions of the axle, is placed on the latter and made to bear against the outer faces of the truck-arms, being firmly held in such position by nuts 18, secured on the ends of the axle. The truck-arms being slightly resilient they can be pressed against the adjustable bearing-cones 11 by means of the nuts 18, and thus prevent said cones from working loose after they shall have been once adjusted.

My improvements are very simple in construction, comprise few parts, are easy and cheap to assemble, and are effectual in all respects in the performance of their functions.

While I have described my improvements as applied to roller-skates, it will be understood that they may be employed in the manufacture of wheels for automobiles and similar vehicles, and the wheels may be mounted in pairs instead of singly, as shown.

Having fully described my invention, what I claim as new, and desire to secure by Letters Patent, is—

1. A wheel comprising two disks constructed with peripheral flanges forming a seat for a tire or rim, the central portions of the disks being separated by an intervening space, means securing the disks together immovably in all directions relatively to each other, and a solid rubber tire molded upon the seat and extending radially into the intervening space between the disks, substantially as set forth.

2. A wheel comprising two disks having peripheral flanges coöperating to form a rim or tire seat, said disks permanently spaced apart means for securing the disks unyieldingly and rigid against displacement toward or away from each other and a rubber rim or tire encircling said seat and disposed on the peripheral flanges and between the disks.

3. In a wheel, the combination of two disks, each having a flanged periphery, rivets having body portions disposed between and provided with shoulders bearing against the inner faces of said disks and having shanks passing through said disks and upset at their outer ends and a rubber rim molded between said peripheral flanges.

In testimony whereof I have signed this specification in the presence of two subscribing witnesses.

THOMAS WALLACE BRYANT.

Witnesses:
WM. H. BRONSON,
FR. SPIELKAN.